US009028316B2

(12) United States Patent
Shai-Hee

(10) Patent No.: US 9,028,316 B2
(45) **Date of Patent: *May 12, 2015**

(54) GAMING SYSTEM AND A METHOD OF GAMING

(75) Inventor: Michael A. Shai-Hee, Kingsgrove (AU)

(73) Assignee: Aristocrat Technologies Australia PTY Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/425,089

(22) Filed: Mar. 20, 2012

(65) Prior Publication Data

US 2012/0178520 A1 Jul. 12, 2012

Related U.S. Application Data

(63) Continuation of application No. 12/325,899, filed on Dec. 1, 2008, now Pat. No. 8,162,749.

(30) Foreign Application Priority Data

Nov. 30, 2007 (AU) ................................ 2007906568

(51) Int. Cl.
*A63F 9/24* (2006.01)
*A63F 13/00* (2014.01)
*G07F 17/32* (2006.01)

(52) U.S. Cl.
CPC ...................................... *G07F 17/32* (2013.01)

(58) Field of Classification Search
USPC ............................................................ 463/20
See application file for complete search history.

(56) References Cited

U.S. PATENT DOCUMENTS 5,257,784 A 11/1993 Boylan et al.
5,833,537 A * 11/1998 Barrie ............................ 463/21
5,980,384 A * 11/1999 Barrie ............................ 463/16
6,375,568 B1 4/2002 Roffman et al.
6,461,241 B1 * 10/2002 Webb et al. ..................... 463/20
6,641,477 B1 * 11/2003 Dietz, II .......................... 463/20
6,852,026 B2 2/2005 Huang
6,866,583 B2 * 3/2005 Glavich et al. .................. 463/20
6,878,064 B2 4/2005 Huang (Continued)

FOREIGN PATENT DOCUMENTS

JP 2002281872 10/2002
JP 2005-185720 A 7/2005

(Continued)

OTHER PUBLICATIONS

United States Patent and Trademark Office "Notice of Allowance," issued in connection with U.S. Appl. No. 12/325,899, mailed on Dec. 21, 2011, 5 pages.

(Continued)

*Primary Examiner* — Steven J Hylinski
(74) *Attorney, Agent, or Firm* — Hanley, Flight and Zimmerman, LLC

(57) ABSTRACT

A gaming system is disclosed which comprises a symbol selector arranged to select a plurality of symbols for display at a plurality of display positions, each display position including at least two symbols, and an outcome evaluator arranged to determine whether symbol combinations defined by the displayed symbols correspond to one or more winning outcomes. Each symbol combination includes one symbol from each display position used to form the symbol combination. A corresponding method is also described.

24 Claims, 7 Drawing Sheets

(56) References Cited

U.S. PATENT DOCUMENTS

| | | | | |
|---|---|---|---|---|
| 6,887,157 | B2 | 5/2005 | LeMay et al. | |
| 6,905,406 | B2 * | 6/2005 | Kaminkow et al. | 463/20 |
| 6,966,835 | B2 | 11/2005 | Graham | |
| 7,137,888 | B2 * | 11/2006 | Glavich et al. | 463/20 |
| 7,156,741 | B2 | 1/2007 | Hornik et al. | |
| 7,278,919 | B2 | 10/2007 | Souza et al. | |
| 7,322,887 | B2 | 1/2008 | Belger et al. | |
| 7,371,170 | B2 | 5/2008 | Cregan et al. | |
| 7,402,102 | B2 * | 7/2008 | Marks et al. | 463/20 |
| 7,419,162 | B2 | 9/2008 | Lancaster et al. | |
| 7,438,639 | B2 | 10/2008 | Osawa | |
| 7,465,230 | B2 | 12/2008 | LeMay et al. | |
| 7,485,043 | B2 | 2/2009 | Beaulieu et al. | |
| 7,503,847 | B2 | 3/2009 | Baerlocher | |
| 7,513,828 | B2 | 4/2009 | Nguyen et al. | |
| 7,857,698 | B2 * | 12/2010 | Hein et al. | 463/25 |
| 8,192,275 | B2 * | 6/2012 | Aoki et al. | 463/20 |
| 8,602,869 | B2 * | 12/2013 | Nicely et al. | 463/20 |
| 2001/0021666 | A1 | 9/2001 | Yoshida et al. | |
| 2002/0065127 | A1 | 5/2002 | Kamimura et al. | |
| 2002/0187836 | A1 | 12/2002 | Meyer | |
| 2003/0045345 | A1 * | 3/2003 | Berman | 463/20 |
| 2003/0104869 | A1 | 6/2003 | Boulton | |
| 2003/0203753 | A1 * | 10/2003 | Muir et al. | 463/20 |
| 2004/0009803 | A1 * | 1/2004 | Bennett et al. | 463/16 |
| 2004/0038727 | A1 | 2/2004 | Aida | |
| 2004/0048646 | A1 | 3/2004 | Visocnik | |
| 2004/0072607 | A1 * | 4/2004 | Thomas et al. | 463/16 |
| 2004/0087368 | A1 | 5/2004 | Gauselmann | |
| 2004/0102244 | A1 | 5/2004 | Kryuchkov et al. | |
| 2004/0106448 | A1 | 6/2004 | Gauselmann | |
| 2005/0054436 | A1 | 3/2005 | Frizzell et al. | |
| 2005/0075167 | A1 | 4/2005 | Beaulieu et al. | |
| 2005/0093240 | A1 | 5/2005 | Jones et al. | |
| 2005/0096123 | A1 | 5/2005 | Cregan et al. | |
| 2005/0101370 | A1 | 5/2005 | Lind et al. | |
| 2006/0035700 | A1 | 2/2006 | Van Asdale | |
| 2006/0040728 | A1 | 2/2006 | Fuller | |
| 2006/0046820 | A1 | 3/2006 | Inamura | |
| 2006/0046830 | A1 | 3/2006 | Webb | |
| 2006/0068898 | A1 | 3/2006 | Maya | |
| 2006/0084492 | A1 | 4/2006 | Baerlocher et al. | |
| 2006/0084498 | A1 | 4/2006 | Baerlocher et al. | |
| 2006/0135238 | A1 | 6/2006 | Lancaster et al. | |
| 2006/0135245 | A1 | 6/2006 | Hedrick et al. | |
| 2006/0154714 | A1 | 7/2006 | Montross et al. | |
| 2006/0172800 | A1 | 8/2006 | Kogo | |
| 2006/0183532 | A1 * | 8/2006 | Jackson | 463/20 |
| 2006/0194629 | A1 | 8/2006 | Strom | |
| 2007/0032285 | A1 | 2/2007 | Wolf | |
| 2007/0060255 | A1 | 3/2007 | Baerlocher et al. | |
| 2007/0066389 | A1 | 3/2007 | Kojima | |
| 2007/0105614 | A1 | 5/2007 | Hornik et al. | |
| 2007/0167215 | A1 | 7/2007 | Majima et al. | |
| 2007/0167226 | A1 | 7/2007 | Kelly et al. | |
| 2007/0197288 | A1 | 8/2007 | Fujimoto et al. | |
| 2007/0275778 | A1 * | 11/2007 | Fong et al. | 463/20 |
| 2009/0191950 | A1 | 7/2009 | Shai-Hee | |
| 2011/0118005 | A1 * | 5/2011 | Bryant et al. | 463/20 |

FOREIGN PATENT DOCUMENTS

| | | |
|---|---|---|
| JP | 2006122237 | 5/2006 |
| JP | 2006122557 | 5/2006 |
| JP | 2006181390 | 7/2006 |
| JP | 2006-280570 A | 10/2006 |
| JP | 2006341013 | 12/2006 |
| JP | 2007050038 | 3/2007 |
| JP | 2007054494 | 3/2007 |
| JP | 2007061423 | 3/2007 |
| JP | 2007082891 | 4/2007 |
| JP | 2007083014 | 4/2007 |
| WO | 2006021023 | 3/2006 |

OTHER PUBLICATIONS

United States Patent and Trademark Office "Non-Final Office Action," issued in connection with U.S. Appl. No. 12/325,899, mailed on Dec. 9, 2011, 5 pages.

* cited by examiner

GAMING SYSTEM AND A METHOD OF GAMING

CROSS-REFERENCE TO RELATED APPLICATIONS

This patent arises from and claims priority to as a continuation of U.S. patent application Ser. No. 12/325,899, filed on Dec. 1, 2008, entitled "A GAMING SYSTEM AND A METHOD OF GAMING", which claims the benefit of priority to Australian Provisional Patent Application No. 2007906568, filed on Nov. 30, 2007, entitled "A GAMING SYSTEM AND A METHOD OF GAMING", each of which is herein incorporated by reference in its entirety.

FIELD OF THE INVENTION

The present invention relates to a gaming system and to a method of gaming.

BACKGROUND OF THE INVENTION

It is known to provide a gaming system which comprises a game controller arranged to randomly display several symbols from a predetermined set of symbols and to determine a game outcome such as a game win based on the displayed symbols. Such gaming systems may commonly be implemented as a stepper machine provided with reels with each reel carrying several symbols of the set, or a video machine wherein selected symbols are displayed on virtual reels on a graphical display device.

However, while such gaming systems provide users with enjoyment, a need exists for alternative gaming systems in order to maintain or increase player enjoyment.

SUMMARY OF THE INVENTION

In accordance with a first aspect of the present invention, there is provided a gaming system including:

a symbol selector arranged to select a plurality of symbols for display at a plurality of display positions, each display position including at least two symbols; and an outcome evaluator arranged to determine whether symbol combinations defined by the displayed symbols correspond to one or more winning outcomes, each symbol combination including a plurality of display positions and each symbol combination including one symbol from each display position used to form the symbol combination.

In one embodiment, the gaming system includes a prize allocator arranged to allocate a prize to a player when a symbol combination corresponds to a winning outcome.

In one embodiment, the symbols comprise a plurality of symbol sets, each display position being associated with at least two symbol sets such that for each display position the symbol selector selects one symbol from each symbol set associated with the display position.

In one embodiment, each symbol set is represented as a reel containing symbols from the symbol set, and the gaming system is arranged such that reels associated with a display position are separated from each other diagonally and the reels appear to spin diagonally.

In one embodiment, each display position is associated with 2, 3 or 4 symbol sets.

In one embodiment, the outcome evaluator is arranged such that simultaneous appearance of a first predefined symbol of a first set of symbols associated with a display position and a second predefined symbol of a second set of symbols associated with the display position defines a winning outcome. The first and second predefined symbols may be arranged so as to match. For example, each the first and second predefined symbols may comprise a portion of a pictorial representation.

At least one set of symbols may include at least one function symbol having an associated function which may be a wild function, a scatter function, a multiplier function, a repeat win function or a jackpot function.

In one embodiment, the gaming system is arranged to operate in normal game mode and special game mode, and each display position includes at least two symbols only during special game mode.

The gaming system may be arranged to commence special game mode when a predetermined game outcome occurs, on the basis of a game event occurring during a game such as display of a particular symbol, in response to player input, based on the amount or type of bet placed, or when a special game is purchased by a player.

The gaming system may be implemented as a stand alone gaming machine or across a network.

In accordance with a second aspect of the present invention, there is provided a method of gaming including:

selecting a plurality of symbols for display at a plurality of display positions, each display position including at least two symbols; and determining whether symbol combinations defined by the displayed symbols correspond to one or more winning outcomes, each symbol combination including a plurality of display positions and each symbol combination including one symbol from each display position used to form the symbol combination.

In accordance with a third aspect of the present invention, there is provided a computer program arranged when loaded into a computer to instruct the computer to operate in accordance with a gaming system including:

a symbol selector arranged to select a plurality of symbols for display at a plurality of display positions, each display position including at least two symbols; and an outcome evaluator arranged to determine whether symbol combinations defined by the displayed symbols correspond to one or more winning outcomes, each symbol combination including a plurality of display positions and each symbol combination including one symbol from each display position used to form the symbol combination.

In accordance with a fourth aspect of the present invention, there is provided a computer readable medium having computer readable program code embodied therein for causing a computer to operate in accordance with a gaming system including:

a symbol selector arranged to select a plurality of symbols for display at a plurality of display positions, each display position including at least two symbols; and an outcome evaluator arranged to determine whether symbol combinations defined by the displayed symbols correspond to one or more winning outcomes, each symbol combination including a plurality of display positions and each symbol combination including one symbol from each display position used to form the symbol combination.

In accordance with a fifth aspect of the present invention, there is provided a data signal having computer readable program code embodied therein for causing a computer to operate in accordance with a gaming system including:

a symbol selector arranged to select a plurality of symbols for display at a plurality of display positions, each display position including at least two symbols; and an outcome evaluator arranged to determine whether symbol combinations defined by the displayed symbols correspond to one or more winning outcomes, each symbol combination including a plurality of display positions and each symbol combination including one symbol from each display position used to form the symbol combination.

BRIEF DESCRIPTION OF THE DRAWINGS

Certain embodiments of the present invention will now be described, by way of example only, with reference to the accompanying drawings, in which.

Figure 1:
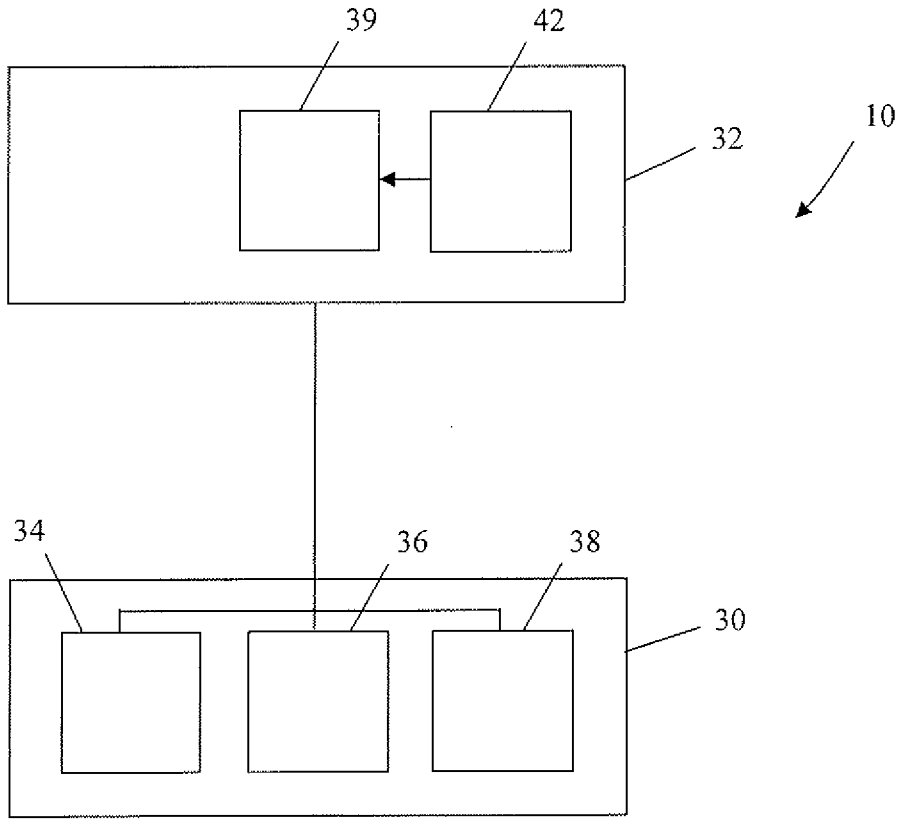
FIG. 1 is a schematic block diagram of core components of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DESCRIPTION OF CERTAIN EMBODIMENTS OF THE INVENTION

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. With some such probabilistic games, the set of symbols include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display in the same line, scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

The present gaming system operates such that winning combinations are determined on the basis of symbol combinations appearing at display positions after symbol selection, and at least during a portion of a game implemented by the gaming system, based on each display position having a plurality of symbols and each symbol combination including one symbol from each display position associated with the symbol combination.

Referring to FIG. 1, a schematic diagram of core components of a gaming system 10 is shown. The core components include a player interface 30 and a game controller 32. The player interface 30 is arranged to enable interaction between a player and the gaming system and for this purpose includes input/output components for the player to enter instructions and play the game.

Components of the player interface 30 may vary but will typically include a credit mechanism 34 to enable a player to input credits and receive payouts, one or more displays 36 which may include a touch screen, and a game play mechanism 38 arranged to enable a player to input game play instructions.

The game controller 32 is in data communication with the player interface 30 and typically includes a processor 39 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
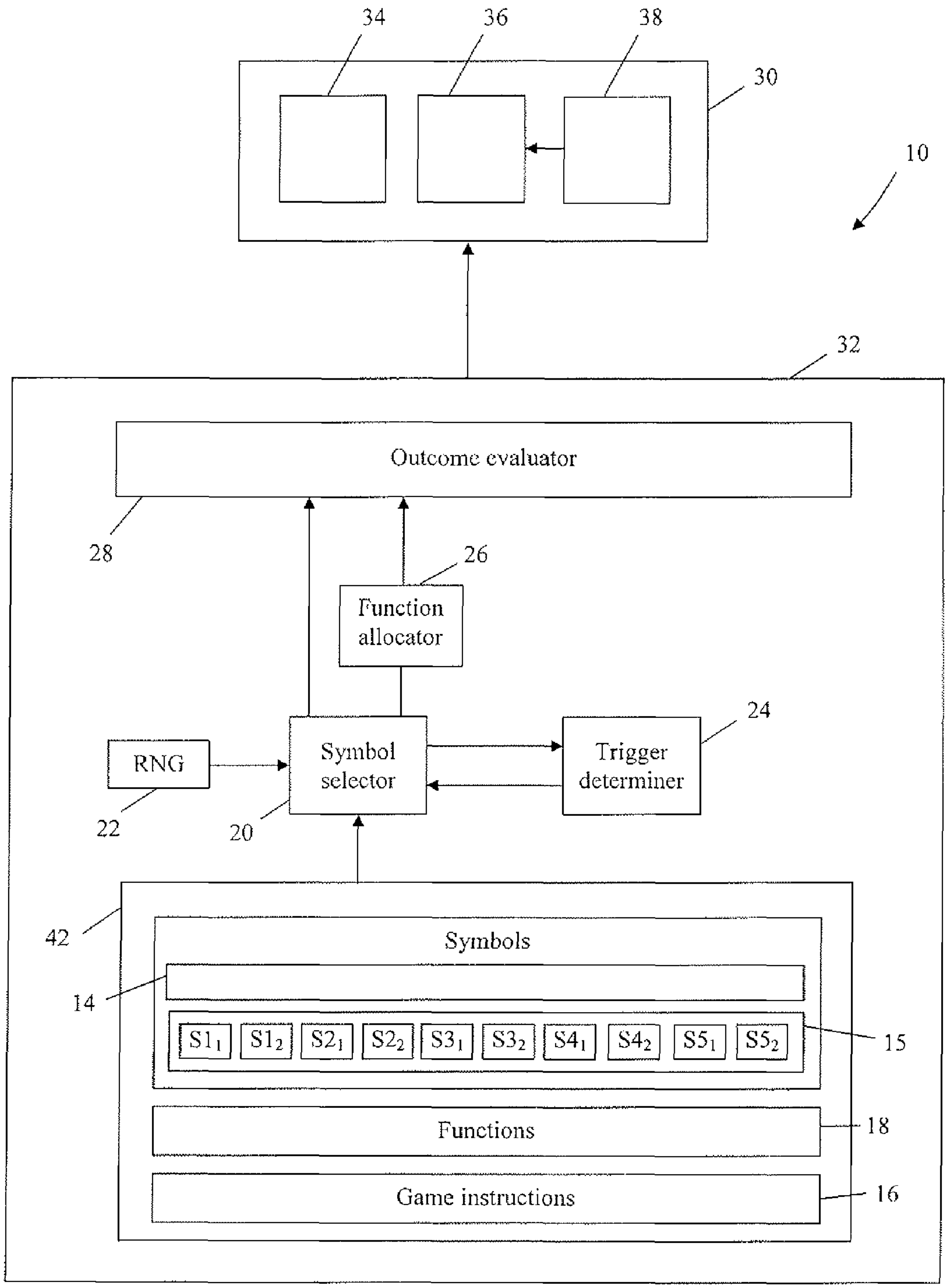
FIG. 2 is a schematic block diagram of functional components of a gaming system in accordance with an embodiment of the present invention.

A functional diagram illustrating operative components of the game controller 32 is shown in FIG. 2.

In this example, the gaming system is arranged to operate in normal mode wherein each display position has one associated symbol set, and special mode wherein each display position has multiple associated symbol sets.

In this example, the memory 42 is arranged to store base symbols data 14 for use in a base game, and feature symbols 15 for use in a feature game. The feature symbols include a plurality of symbol sets $S1_1$, $S1_2$, $S2_1$, $S2_2$, $S3_1$, $S3_2$, $S4_1$, $S4_2$, $S5_1$, $S5_2$, each of which in this example is associated with a reel. The memory 42 is also arranged to store function data 16 indicative of one or more functions allocatable to the symbols, and game instruction data 18 indicative of game instructions usable by the gaming machine 10 to control operation of the game.

Each symbol set $SN_N$ corresponds to a reel $R1_1$, $R1_2$, $R2_1$, $R2_2$, $R3_1$, $R3_2$, $R4_1$, $R4_2$, $R5_1$, $R5_2$ which is spun during use and subsequently stopped to display at least one symbol. Each display location has an associated plurality of symbol sets, in this example a pair of symbol sets $SN_1$, $SN_2$.

The game controller 32 includes a symbol selector 20 which is arranged during special game mode to select several symbols from the available symbol sets $SN_N$ for display to a player in a plurality of display positions, in this example by spinning reels $RN_N$ containing the symbol sets and stopping the reels so as to display at least one symbol from each symbol set $SN_N$. Each display position is associated with two symbol sets such that one symbol from each of the associated symbol sets $RN_N$ is shown at each display position. In this example, the selection carried out by the symbol selector 20 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

With this embodiment, the game controller 32 also includes a trigger determiner 24 arranged to determine whether a trigger condition exists and to commence special game mode when a trigger condition has been detected. Such a trigger condition may be display of a particular symbol or combination of symbols.

In this example, the game controller 32 also includes a function allocator 26 arranged to select and allocate one or more functions to one or more symbols. Such functions include a wild function, a scatter function, or any other function which may be applied to a symbol or to the game.

The game controller 32 also includes an outcome evaluator 28 which in accordance with the game instructions 18 determines game outcomes based on the symbols selected for display to the player by the symbol selector 20.

In the embodiments described below, the symbol selector 20, the trigger determiner 24, the function allocator 26, and the outcome evaluator 28 are at least partly implemented using the processor 39 and associated software, although it will be understood that other implementations are envisaged.

The gaming system 10 can take a number of different forms.

In a first form, a stand alone gaming machine is provided wherein all or most components for implementing the game are present in a player operable gaming machine.

In a second form, a distributed architecture is provided wherein some of the components for implementing the game are present in a player operable gaming machine and some of the components for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
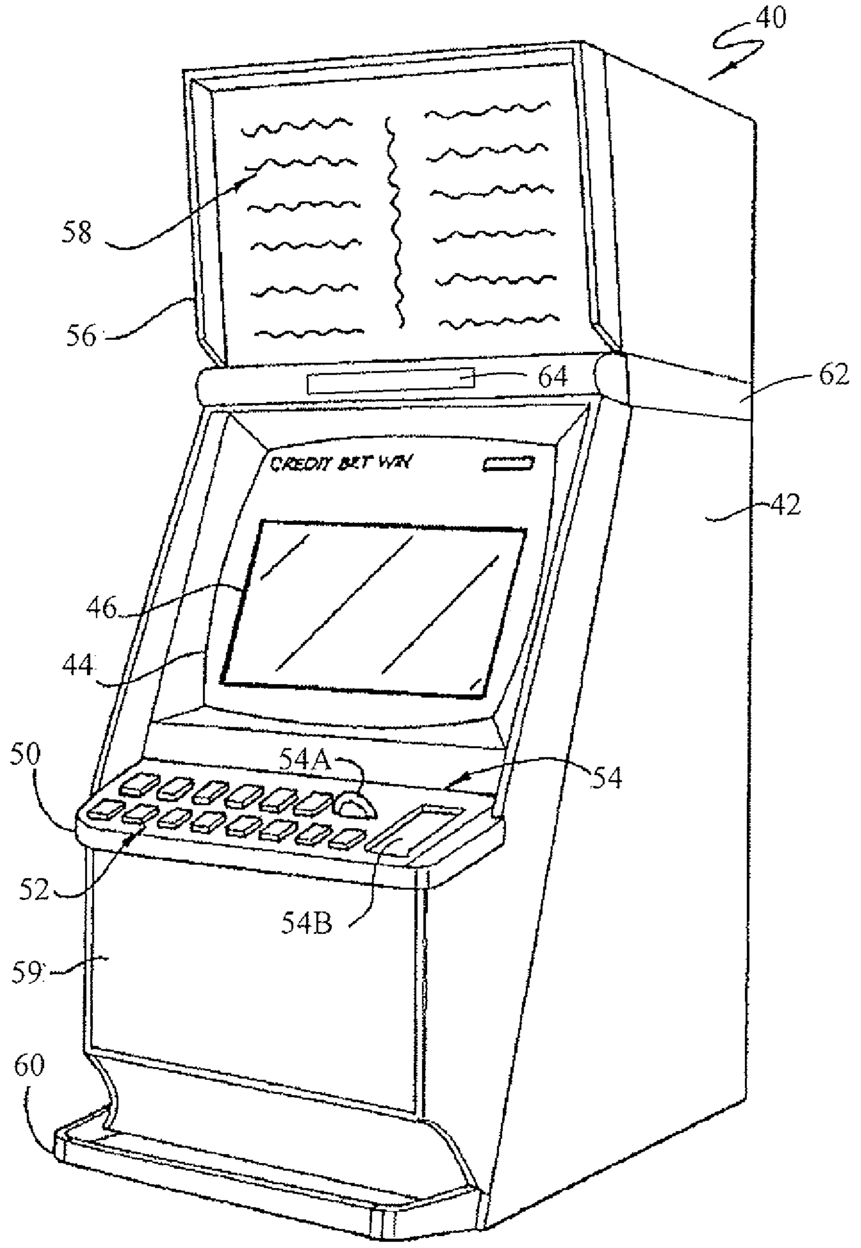
FIG. 3 is a diagrammatic representation of a gaming system in accordance with an embodiment of the present invention with the gaming system implemented in the form of a stand alone gaming machine.

A gaming system in the form of a stand alone gaming machine 40 is illustrated in FIG. 3. The gaming machine 40 includes a console 42 having a display 44 on which is displayed representations of a game 46 that can be played by a player. A mid-trim 50 of the gaming machine 40 houses a bank of buttons 52 for enabling a player to interact with the gaming machine, in particular during gameplay. The mid-trim 50 also houses a credit input mechanism 54 which in this example includes a coin input chute 54A and a bill collector 54B. Other credit input mechanisms may also be employed, for example, a card reader for reading a smart card, debit card or credit card.

A top box 56 may carry artwork 58, including for example pay tables and details of bonus awards and other information or images relating to the game. Further artwork and/or information may be provided on a front panel 59 of the console 42. A coin tray 60 is mounted beneath the front panel 59 for dispensing cash payouts from the gaming machine 30.

The display 44 is in the form of a video display unit, particularly a cathode ray tube screen device. Alternatively, the display 44 may be a liquid crystal display, plasma screen, or any other suitable video display unit. The top box 56 may also include a display, for example a video display unit, which may be of the same type as the display 44, or of a different type. The display 44 may include a touch screen usable by a player to interact with the gaming machine, in particular during game play.

The display 44 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols.

A player marketing module (PMM) 62 having a display 64 is connected to the gaming machine 10. The main purpose of the PMM 62 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
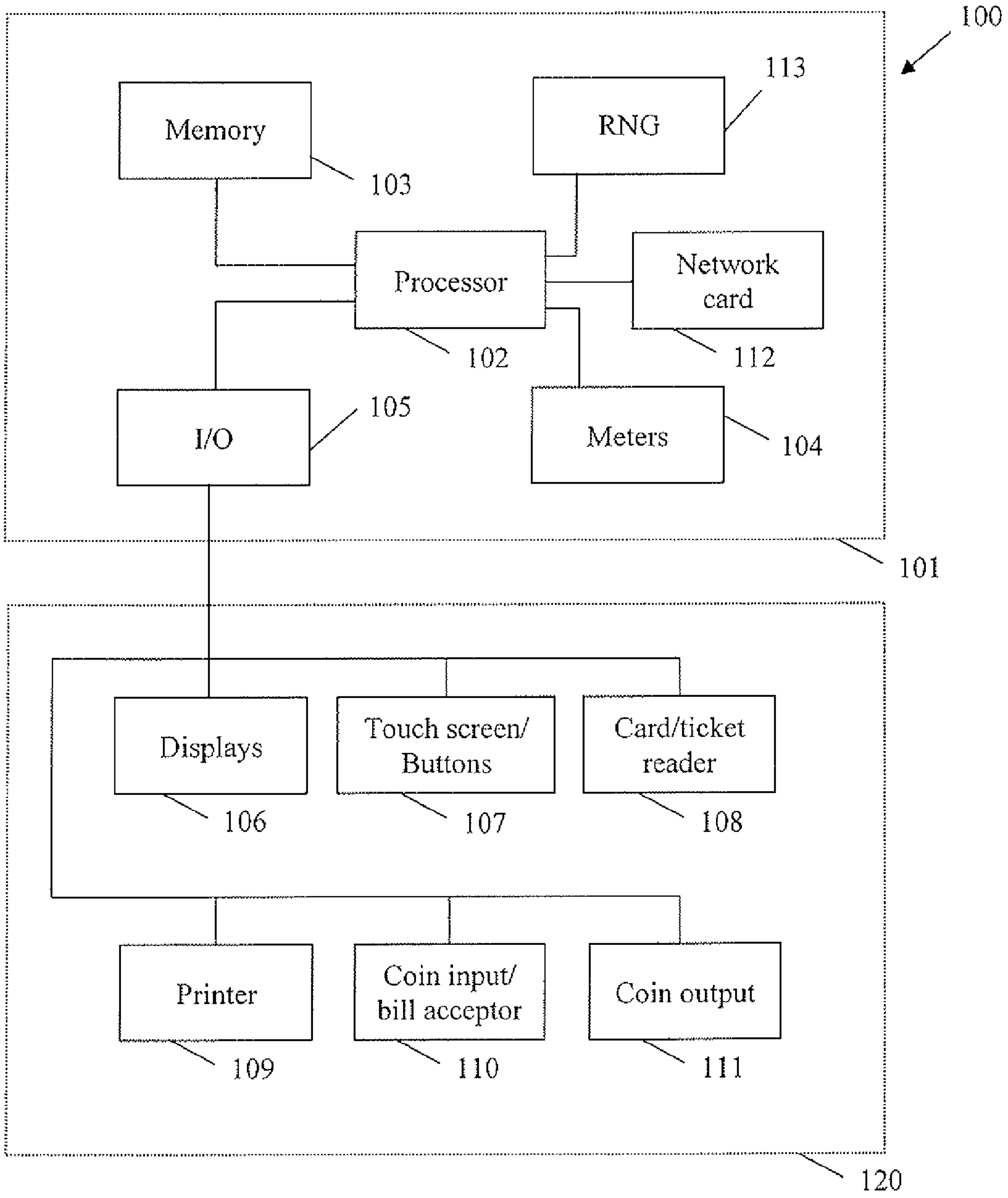
FIG. 4 is a schematic block diagram of operative components of the gaming machine shown in FIG. 3.

FIG. 4 shows a block diagram of operative components of a gaming machine 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
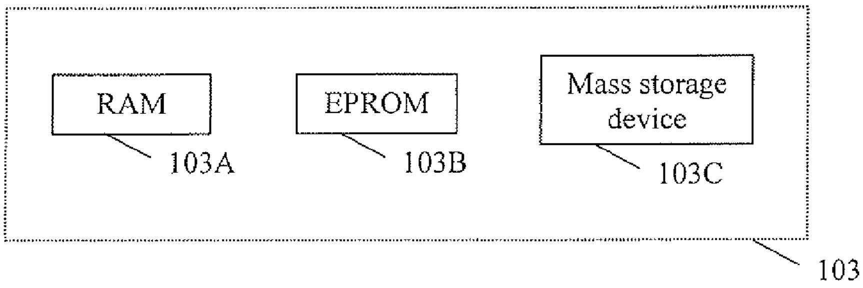
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 include one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

Figure 6:
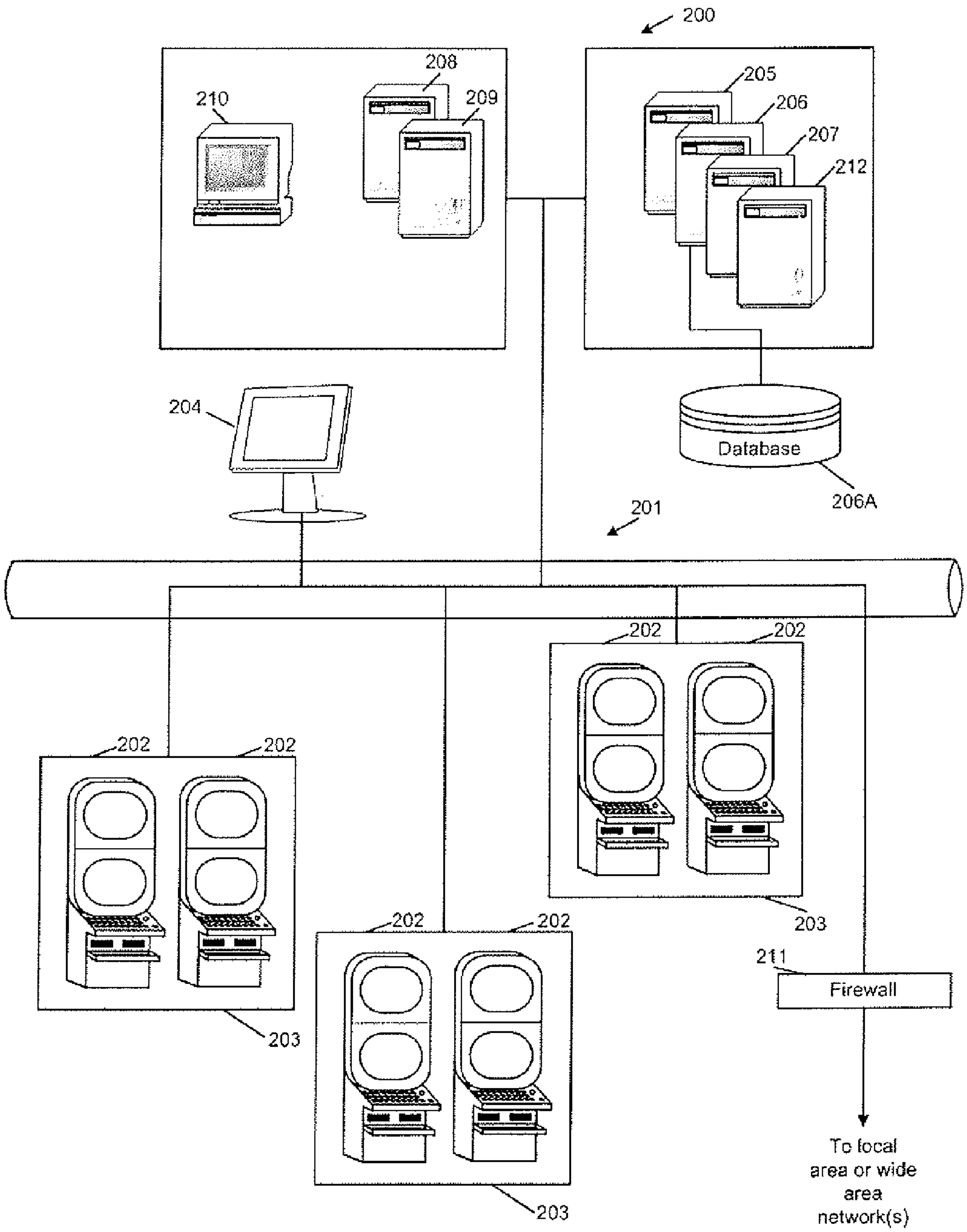
FIG. 6 is a schematic diagram of a gaming system in accordance with an alternative embodiment of the present invention with the gaming system implemented over a network.

FIG. 6 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

During operation, the game controller, whether implemented in a stand alone gaming machine 10, 40, 100 or over a network 201, implements a probabilistic game wherein at least during part of the game the gaming system displays at least two symbols at each display position, and game outcomes are determined on the basis of symbol combinations constituted by a plurality of display positions with each symbol combination including one symbol from each display position forming part of the symbol combination.

Examples of specific implementations of the gaming system will now be described in relation to a stand alone gaming machine 10, 40, 100 although it will be understood that implementation may also be carried out using other gaming system architectures such as a network architecture of the type shown in FIG. 6.

In this example, the gaming system is operable in normal game mode and special game mode.

During normal game mode, each display position is associated with one reel and, accordingly, with one set of symbols. The reels include standard symbols and optionally one or more function symbols. Win outcomes are determined on the basis of the symbols visible at the display positions when the reels stop rotating.

Figure 8A:
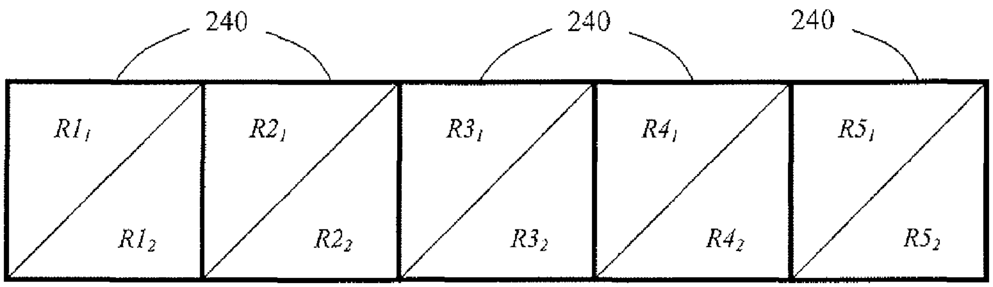
FIGS. 8*a* and 8*b* are diagrammatic representations of an example symbol configuration of a gaming system in accordance with an embodiment of the present invention during implementation of a game.

During special game mode, each display position 240 is associated with two reels $RN_N$ and, accordingly, with two sets $SN_N$ of symbols, as shown in FIG. 8*a*. In this example, the two reels $RN_N$ associated with a display position 240 are separated from each other diagonally such that during use the reels $RN_N$ appear to spin diagonally. As with normal game mode, the reels include standard symbols and optionally one or more function symbols.

The gaming system may be arranged to commence special game mode when a predetermined game outcome occurs, and special game mode may include one or more free games, in this example three free games. Special game mode may commence automatically on the basis of a game event occurring during a game such as display of a particular symbol, based on game outcomes determined by the gaming system, or may be prompted by a player pressing a button on the gaming system 10, 40, 100 after the player has identified that a game outcome corresponding to special game mode requirements has occurred.

The gaming system 10, 40, 100 may also be arranged so as to determine eligibility for special game mode, for example based on the amount or type of bet placed, based on certain time periods and so on.

Special game mode may also be arranged to commence when a special game is purchased by a player.

Figure 7:
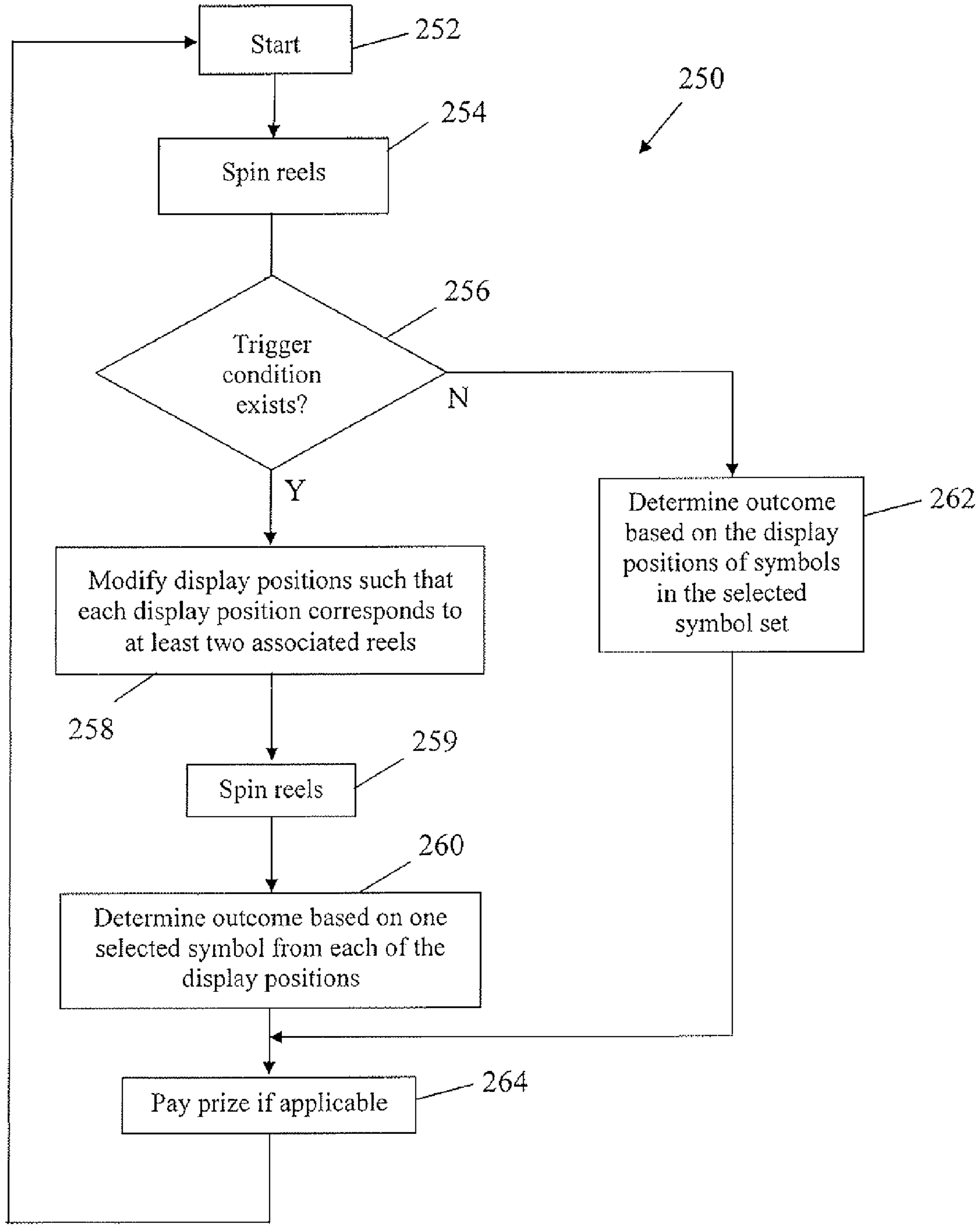
FIG. 7 is a flow diagram illustrating game play of a gaming system in accordance with an embodiment of the present invention.

A specific example will now be described in relation to flow diagram 250 shown in FIG. 7 which illustrates steps 252 to 264 of a method of gaming implemented by the gaming system according to the present embodiment.

In this example, ten reels $R1_1$, $R1_2$, $R2_1$, $R_2$, $R3_1$, $R3_2$, $R4_1$, $R4_2$, $R5_1$, $R5_2$ are provided, with each display position 240 showing two reels. The reels are virtual reels and, as such, representations of the reels are displayed on a graphical display device 44.

After commencement of special game mode, the reels $RN_N$ are spun and subsequently stopped to display two symbols at each display position 240. An example screen representation 300 shown on the display device 44 is shown in FIG. 8*b*.

The outcome evaluator 28 then determines whether the symbols displayed at the display positions 240 correspond to a winning outcome by reference to the best combination of symbols derived by selecting one of the symbols from each display position. For example, in the present example, a winning outcome including three King symbols can be obtained by reference to the King symbol shown on the first reel $R1_1$ at the first display position 240*a*, the King symbol shown on the second reel $R2_2$ at the second display position 240*b*, and the King symbol shown on the second reel $R3_2$ at the third display position 240*c*.

Figure 8B:
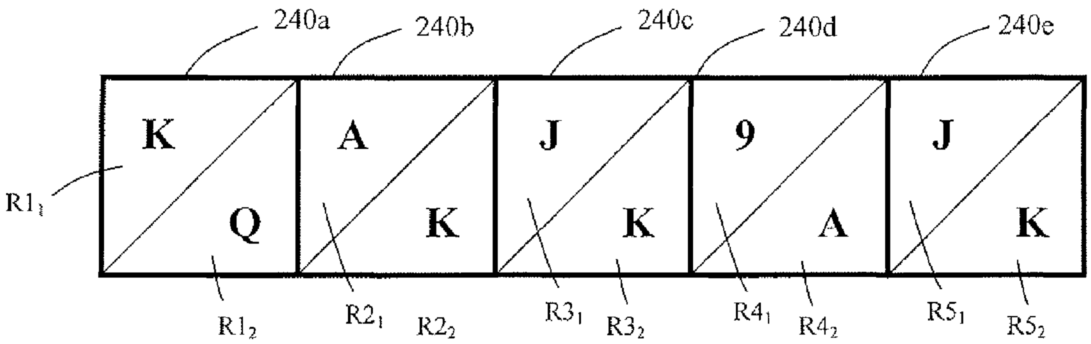

It will be understood that while only one symbol from each reel $RN_N$ is shown in FIGS. 8*a* and 8*b*, other variations are possible including an arrangement wherein three display positions for each reel are provided such that three symbols from each reel are displayed.

Figure 9:
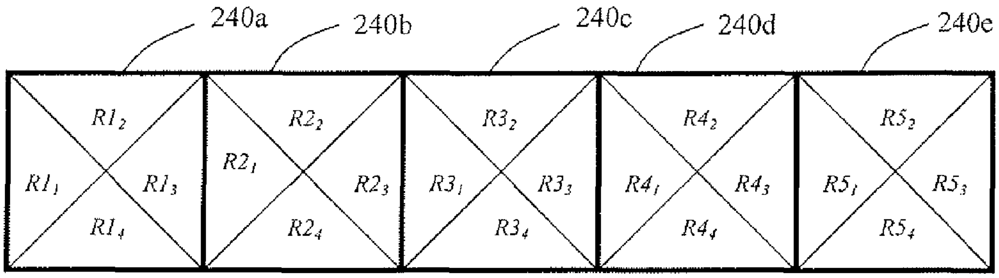
FIG. 9 is a diagrammatic representation of an example symbol configuration of a gaming system in accordance with an alternative embodiment of the present invention.

It will also be understood that more than two reels may be associated with each display position 240. For example, as shown in FIG. 9, four reels $RN_N$ may be associated with each reel.

It will also be understood that instead of selecting one of the symbols shown at a display position by reference to the best possible combination of symbols derived by selecting one of the symbols from each display position, a symbol to be used in determining a game outcome may be selected in other ways, for example randomly or based on game rules.

Modifications and variations as would be apparent to a skilled addressee are deemed to be within the scope of the present invention.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Method steps associated with certain embodiments may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

The invention claimed is:

1. A gaming system comprising:

a symbol selector arranged to select a plurality of symbols for display at a plurality of display positions, each display position including at least two symbols; and an outcome evaluator arranged to determine whether symbol combinations defined by the displayed symbols correspond to one or more winning outcomes, each symbol combination including one symbol from each display position used to form the symbol combination, wherein the symbols comprise a plurality of symbol sets, each display position being associated with at least two symbol sets such that for each display position the symbol selector selects one symbol from each symbol set associated with the display position, wherein each symbol set is represented as a reel containing symbols from the symbol set, and wherein the outcome evaluator is arranged to randomly select one symbol from each display position and determine whether the symbols selected correspond to a winning outcome.

2. A gaming system as claimed in claim 1, comprising a prize allocator arranged to allocate a prize to a player when a symbol combination corresponds to a winning outcome.

3. A gaming system as claimed in claim 1, wherein the symbols comprise a plurality of symbol sets, each display position being associated with at least two symbol sets such that for each display position the symbol selector selects one symbol from each symbol set associated with the display position.

4. A gaming system as claimed in claim 3, wherein each symbol set is represented as a reel containing symbols from the symbol set, and the gaming system is arranged such that reels associated with a display position are separated from each other diagonally and the reels appear to spin diagonally.

5. A gaming system as claimed in claim 3, wherein each display position is associated with 2, 3 or 4 symbol sets.

6. A gaming system as claimed in claim 1, wherein the outcome evaluator is arranged to determine whether the symbols displayed at the display positions correspond to a winning outcome by reference to the best combination of symbols derived by selecting one of the symbols from each display position.

7. A gaming system as claimed in claim 1, wherein the outcome evaluator is arranged to select one symbol from each display position according to a game rule and determine whether the symbols selected correspond to a winning outcome.

8. A gaming system as claimed in claim 1, wherein the outcome evaluator is arranged such that simultaneous appearance of a first predefined symbol of a first set of symbols associated with a display position and a second predefined symbol of a second set of symbols associated with the display position defines a winning outcome.

9. A gaming system as claimed in claim 8, wherein the first and second predefined symbols are to be arranged so as to match.

10. A gaming system as claimed in claim 9, wherein each the first and second predefined symbols comprises a portion of a pictorial representation.

11. A gaming system as claimed in claim 1, wherein the symbols comprise at least one function symbol having an associated function which may be a wild function, a scatter function, a multiplier function, a repeat win function or a jackpot function.

12. A gaming system as claimed in claim 1, wherein the gaming system is arranged to operate in normal game mode and special game mode, and each display position includes at least two symbols only during special game mode.

13. A gaming system as claimed in claim 1, wherein the gaming system is arranged to commence special game mode when a predetermined game outcome occurs, on the basis of a game event occurring during a game such as display of a particular symbol, in response to player input, based on the amount or type of bet placed, or when a special game is purchased by a player.

14. A method of gaming comprising:

selecting a plurality of symbols for display at a plurality of display positions, each display position including at least two symbols; and determining whether symbol combinations defined by the displayed symbols correspond to one or more winning outcomes, each symbol combination including one symbol from each display position used to form the symbol combination, said determining comprising randomly selecting one symbol from each display position and determining whether the symbols selected correspond to a winning outcome, wherein the symbols comprise a plurality of symbol sets, each display position being associated with at least two symbol sets such that for each display position the symbol selector selects one symbol from each symbol set associated with the display position, and wherein each symbol set is represented as a reel containing symbols from the symbol set.

15. A method as claimed in claim 14, comprising allocating a prize to a player when a symbol combination corresponds to a winning outcome.

16. A method as claimed in claim 14, comprising providing a plurality of symbol sets, each display position being associated with at least two symbol sets such that for each display position one symbol from each symbol set associated with the display position is selected.

17. A method as claimed in claim 16, comprising representing each symbol set as a reel containing symbols from the symbol set, and separating reels associated with a display position from each other diagonally such that the reels appear to spin diagonally.

18. A method as claimed in claim 16, wherein each display position is associated with 2, 3 or 4 symbol sets.

19. A method as claimed in claim 14, comprising determining whether the symbols displayed at the display positions correspond to a winning outcome by reference to the best combination of symbols derived by selecting one of the symbols from each display position.

20. A method as claimed in claim 14, comprising selecting one symbol from each display position according to a game rule and determining whether the symbols selected correspond to a winning outcome.

21. A method as claimed in claim 14, comprising defining a winning outcome when a first predefined symbol of a first set of symbols associated with a display position and a second predefined symbol of a second set of symbols associated with the display position simultaneously appear.

22. A method as claimed in claim 21, wherein the first and second predefined symbols match.

23. A method as claimed in claim 22, wherein each the first and second predefined symbols comprises half of a pictorial representation.

24. A non-transitory computer readable medium including a computer program arranged when loaded into a computer to instruct the computer to operate in accordance with a gaming system comprising:

a symbol selector arranged to select a plurality of symbols for display at a plurality of display positions, each display position including at least two symbols; and an outcome evaluator arranged to determine whether symbol combinations defined by the displayed symbols correspond to one or more winning outcomes, each symbol combination including one symbol from each display position used to form the symbol combination, wherein the symbols comprise a plurality of symbol sets, each display position being associated with at least two symbol sets such that for each display position the symbol selector selects one symbol from each symbol set associated with the display position, wherein each symbol set is represented as a reel containing symbols from the symbol set, and wherein the outcome evaluator is arranged to randomly select one symbol from each display position and determine whether the symbols selected correspond to a winning outcome.

* * * * *